United States Patent
Shoda

(10) Patent No.: US 8,031,370 B2
(45) Date of Patent: Oct. 4, 2011

(54) DEVICE AND METHOD REMOVES BACKGROUND COMPONENT FROM IMAGE USING WHITE REFERENCE VALUE AND BACKGROUND REMOVAL LEVEL VALUE

(75) Inventor: Hirokazu Shoda, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 591 days.

(21) Appl. No.: 12/207,779

(22) Filed: Sep. 10, 2008

(65) Prior Publication Data
US 2009/0073509 A1 Mar. 19, 2009

Related U.S. Application Data

(60) Provisional application No. 60/972,486, filed on Sep. 14, 2007.

(51) Int. Cl.
H04N 1/407 (2006.01)
H04N 1/56 (2006.01)
G06T 5/00 (2006.01)
G06T 5/40 (2006.01)

(52) U.S. Cl. ....... 358/2.1; 358/3.21; 358/3.23; 358/521; 358/522; 358/461; 358/464; 358/465; 382/169; 382/172; 382/274

(58) Field of Classification Search ............... 358/1.9, 358/2.1, 3.21, 3.23, 521, 522, 461, 464, 465; 382/168, 169, 172, 274
See application file for complete search history.

(56) References Cited

U.S. PATENT DOCUMENTS

| | | | | | |
|---|---|---|---|---|---|
| 5,410,617 | A | * | 4/1995 | Kidd et al. | 382/169 |
| 5,699,454 | A | * | 12/1997 | Nakai et al. | 382/172 |
| 6,222,642 | B1 | * | 4/2001 | Farrell et al. | 358/1.9 |
| 2006/0082846 | A1 | | 4/2006 | Sakakibara et al. | |
| 2006/0209312 | A1 | | 9/2006 | Shoda | |
| 2008/0186518 | A1 | | 8/2008 | Shoda | |

FOREIGN PATENT DOCUMENTS

| | | | |
|---|---|---|---|
| JP | 03068270 A | * | 3/1991 |
| JP | 04-313744 | | 11/1992 |
| JP | 06-189128 | | 7/1994 |
| JP | 10-191059 | | 7/1998 |
| JP | 2000-101839 | | 4/2000 |
| JP | 2006-246136 | | 9/2006 |
| JP | 2009284408 A | * | 12/2009 |

* cited by examiner

*Primary Examiner* — Scott A Rogers
(74) *Attorney, Agent, or Firm* — Turocy & Watson, LLP

(57) ABSTRACT

An image processing device includes a histogram generation unit configured to generate a density histogram on the basis of image data of an original document, a white-reference value detection unit configured to acquire as a white reference value a density value at a density distribution peak in a predetermined white side range of the density histogram, a background-removal level determination unit configured to determine a background-removal level value having the maximum density to remove a background component by using a reference table on the basis of the white reference value, and a background removal unit configured to remove the background component from the image data by using the white reference value and the background-removal level value.

20 Claims, 8 Drawing Sheets

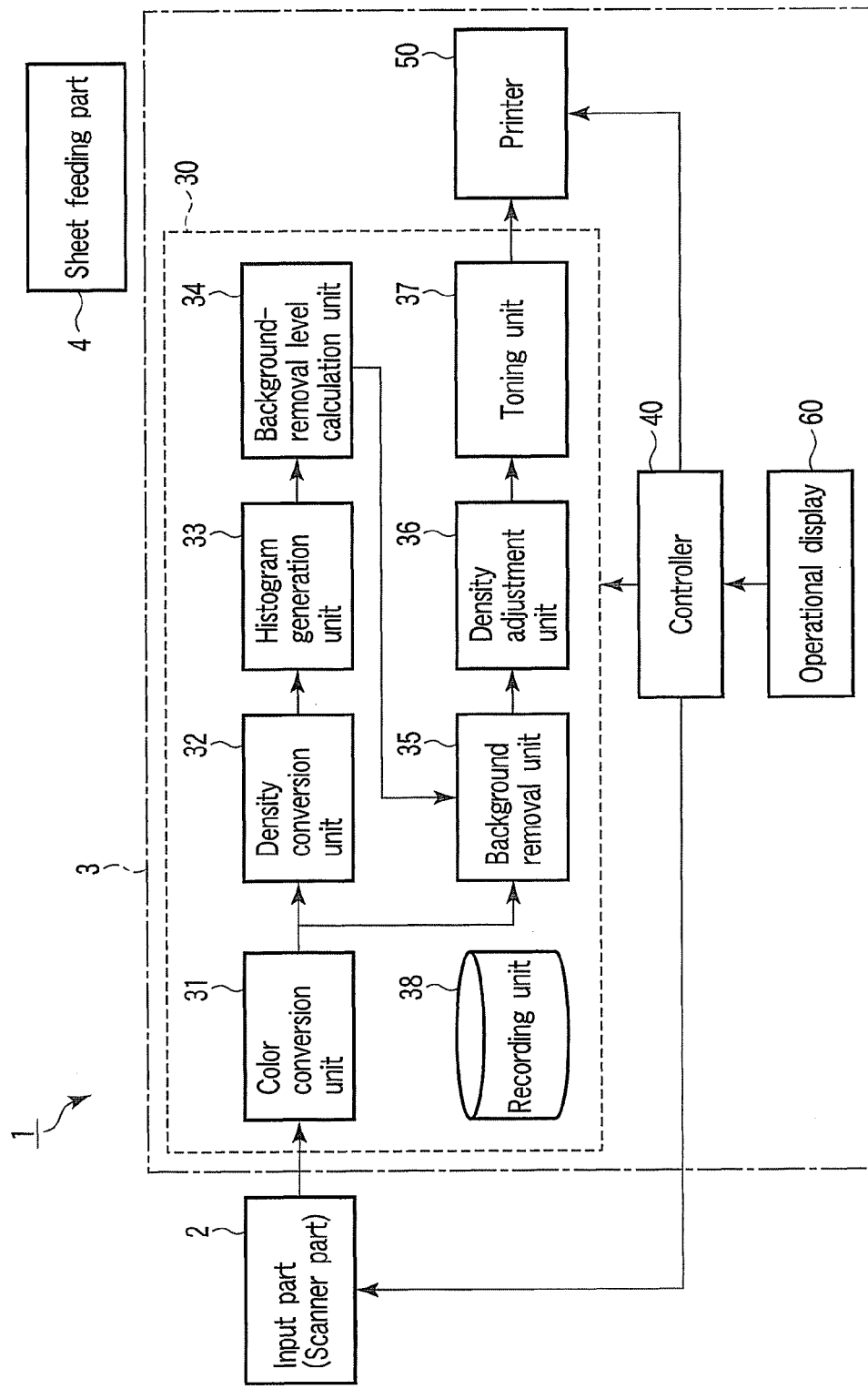
F I G. 2

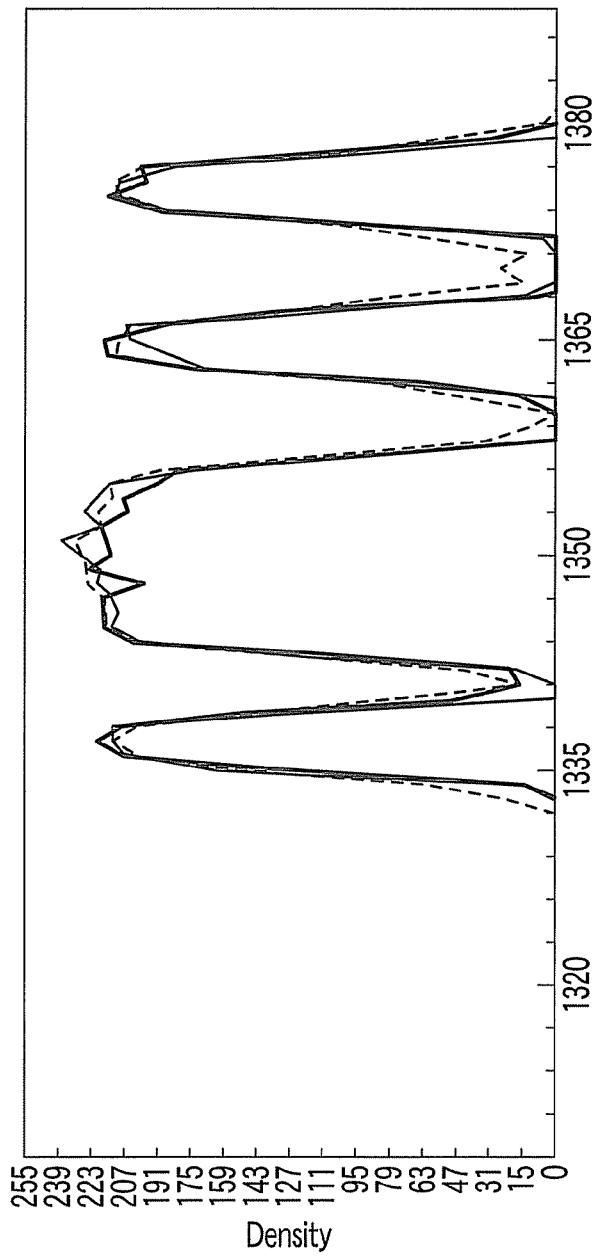
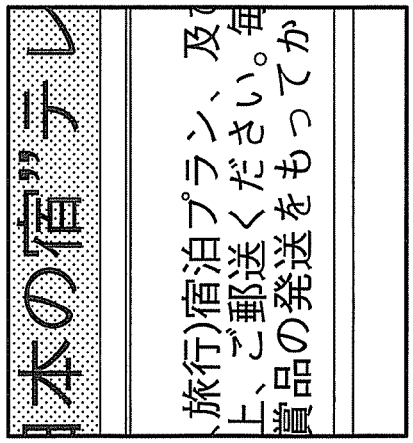
FIG. 11B
FIG. 11A

DEVICE AND METHOD REMOVES BACKGROUND COMPONENT FROM IMAGE USING WHITE REFERENCE VALUE AND BACKGROUND REMOVAL LEVEL VALUE

CROSS-REFERENCE TO RELATED APPLICATION

This application is based upon and claims the benefit of U.S. Provisional Application No. 60/972,486, filed Sep. 14, 2007.

TECHNICAL FIELD

The present invention relates to an image processing device, an image processing method, and an image reading device for removing a background component of an original document from an image signal obtained by scanning the original document.

BACKGROUND

Generally, in an image processing device such as a digital copying machine for treating image data, image data is read from an original document by image reading means such as a scanner, and digitized. The digital image data is processed in accordance with the purpose, multileveled, and output through image output means such as a laser printer. The image processing device has a density adjusting function. The density adjusting function automatically adjusts density of the print to be suitable for the original document, if the image data read by the scanner includes a background portion of the original document or the letters in the original document are light-colored.

The density adjusting function includes the following functions. First function generates a density histogram from an input image data. Second function determines the kind of the input original document, that is, the kind of the input image data on the basis of characteristic value of the generated density histogram. Third function corrects an image tone of the input image data in accordance with the determination result.

Japanese Unexamined Patent Application Publication No. H10-191059 discloses an image processing device. The image processing device has a function of removing a background. When removing a background, the image processing device selects a density correction table from a plurality of predetermined density correction tables on the basis of the determination result of the characteristics of the original document. The image processing device performs a process of removing the background on the basis of the selected density correction table.

SUMMARY

According to a first aspect of the invention, an image processing device includes: a histogram generation unit configured to generate a density histogram on the basis of image data of an original document; a white-reference value detection unit configured to acquire as a white reference value a density value at a density distribution peak in a predetermined white side range of the density histogram; a background-removal level determination unit configured to determine a background-removal level value having the maximum density to remove a background component by using a reference table on the basis of the white reference value; and a background removal unit configured to remove the background component from the image data by using the white reference value and the background-removal level value.

According to a second aspect of the invention, an image processing method includes: generating a density histogram on the basis of image data of an original document; acquiring as a white reference value a density value at a density distribution peak in a predetermined white side range of the density histogram; determining a background-removal level value having the maximum density to remove a background component by using a reference table on the basis of the white reference value; and removing the background component from the image data by using the white reference value and the background-removal level value.

According to a third aspect of the invention, an image input unit configured to form image data by irradiating an original document with light and photo-electrically converting the light reflected from the original document; a histogram generation unit configured to generate a density histogram on the basis of the image data; a white-reference value detection unit configured to acquire as a white reference value a density value at a density distribution peak in a predetermined white side range of the density histogram; a background-removal level determination unit configured to determine a background-removal level value having the maximum density to remove a background component by using a reference table on the basis of the white reference value; and a background removal unit configured to remove the background component from the image data by using the white reference value and the background-removal level value.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 2 is a block diagram showing an example of an image forming part.

FIGS. 11A and 11B are diagrams showing the image after the background removing and a signal curve of the part of lines on which letters of the image are noted.

DETAILED DESCRIPTION

Embodiments of an image processing device, an image processing method and image reading device will be described with reference to the accompanying drawings.

Figure 1:
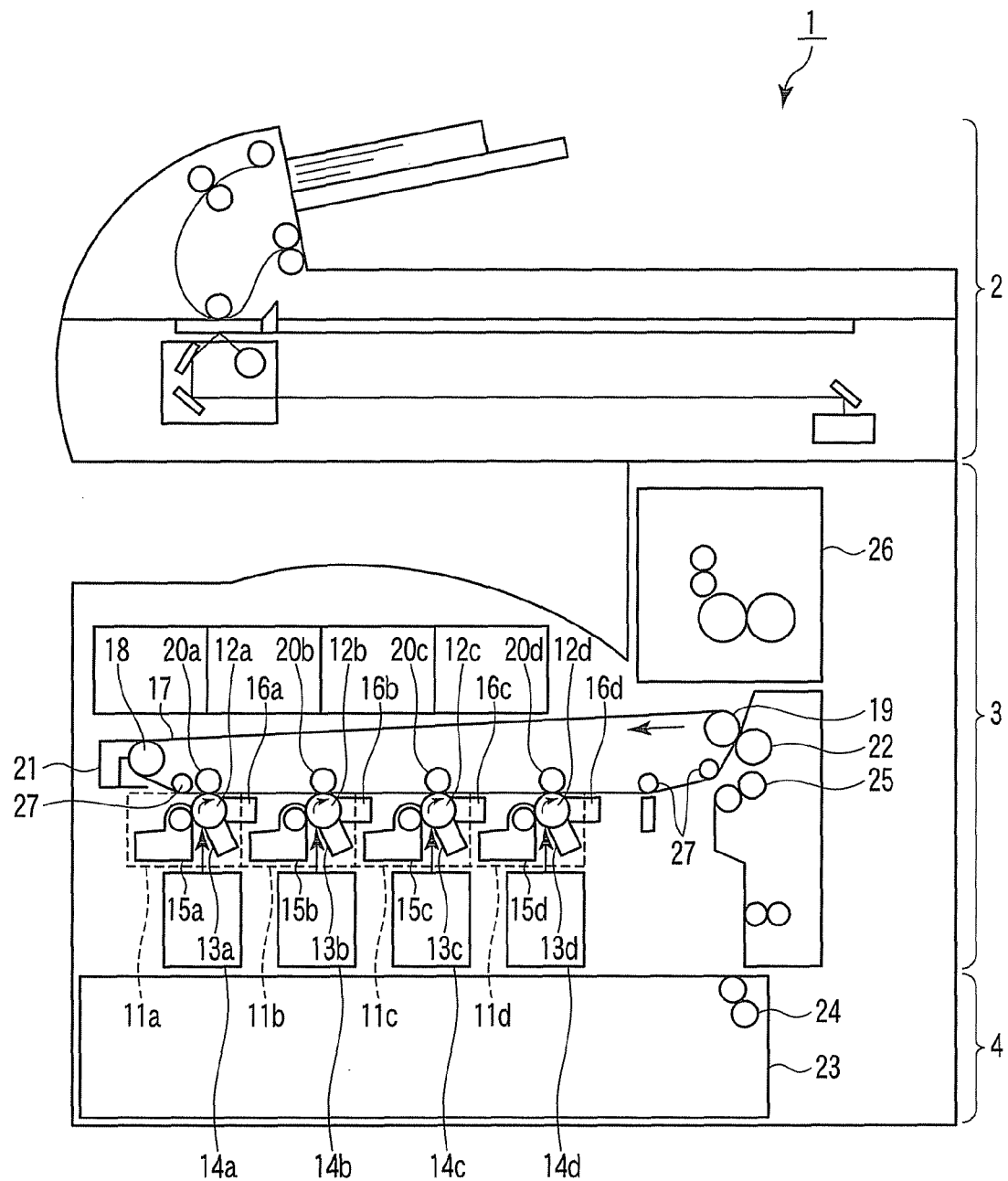
FIG. 1 is a diagram showing an example of an image forming apparatus.

FIG. 1 is a diagram showing an exemplary configuration of a tandem-type image forming apparatus 1 having an image processing device mounted thereon. As shown in FIG. 1, the image forming apparatus 1 includes a scanner part 2, an image forming part 3, and a sheet feeding part 4.

The scanner part 2 irradiates an original document set on a platen with light, guides the reflected light from the original document to light receiving elements via plural optical members, performs photoelectric conversion thereon, and supplies image signals to the image forming part 3.

Four process cartridges 11a, 11b, 11c, and 11d are provided in the image forming part 3. The process cartridges 11a, 11b, 11c, and 11d correspond to yellow (Y), magenta (M), cyan (C), and black (K) and have photoconductive drums 12a, 12b, 12c, and 12d, respectively. The image forming part 3 forms toner images on these photoconductive drums 12a, 12b, 12c, and 12d.

The photoconductive drum 12a has a cylindrical shape, and is provided rotatably in a direction of an arrow in the drawing. First, a charging charger 13a is provided facing the surface of the photoconductive drum 12a. The charging charger 13a uniformly and negatively (−) charges the photoconductive drum 12a. An exposure device 14a for exposing the photoconductive drum 12a charged by the charging charger 13a to light to form an electrostatic latent image is provided. The exposure device 14a exposes the photoconductive drum 12a to light using a laser beam optically modulated in response to an image signal supplied from the scanner part 2. The exposure device 14a may use an LED (Light Emitting Diode) in place of the laser beam.

At the further downstream side of the exposure device 14a, a developing unit 15a for performing reversal development of the electrostatic latent image formed by the exposure device 14a is provided. In the developing unit 15a, a developer of yellow (Y) is contained.

At the downstream side of the developing unit 15a, an intermediate transfer belt 17 is provided in contact with the photoconductive drum 12a.

The intermediate transfer belt 17 has a length (width) nearly equal to the length along the shaft direction of the photoconductive drum 12a in a direction perpendicular to the conveying direction (in the depth direction of the drawing). The intermediate transfer belt 17 is wrapped around a driving roller 18 that rotates the belt and a secondary transfer opposing roller 19 as a driven roller and carried. A tension roller 27 for holding the intermediate transfer belt 17 at constant tension is provided at the downstream side of the driving roller 18.

A toner cleaner 16a is provided at the further downstream side of the contact position between the photoconductive drum 12a and the intermediate transfer belt 17. The toner cleaner 16a removes residual toner on the photoconductive drum 12a, which had previously transferred toner to the intermediate transfer belt 17, by a cleaning blade.

Not only the process cartridge 11a but also the process cartridges 11b, 11c, and 11d are sequentially provided between the driving roller 18 and the secondary transfer opposing roller 19 along the conveying direction of the intermediate transfer belt 17. All of the respective process cartridges 11b, 11c, and 11d have the same configuration as that of the process cartridge 11a.

Specifically, the photoconductive drums 12b, 12c, and 12d are provided nearly at the center of the respective process cartridges. Further, charging chargers 13b, 13c, and 13d are respectively provided facing the surfaces of the respective photoconductive drums 12b, 12c, and 12d. At the downstream of the charging chargers 13b, 13c, and 13d, exposure devices 14b, 14c, and 14d for exposing the charged photoconductive drums 12b, 12c, and 12d to light to form electrostatic latent images are provided. At the further downstream side of the exposure devices 14b, 14c, and 14d, developing units 15b, 15c, and 15d for performing reversal development of the electrostatic latent images formed by the exposure devices 14b, 14c, and 14d are provided. Toner cleaners 16b, 16c, and 16d are provided closer to the downstream side than the contact positions between the photoconductive drums 12b, 12c, and 12d and the intermediate transfer belt 17. A developer of magenta (M), a developer of cyan (C), and a developer of black (K) are contained in the developing units 15b, 15c, and 15d, respectively.

The intermediate transfer belt 17 sequentially contacts the respective photoconductive drums 12a to 12d. Primary transfer rollers 20a, 20b, 20c, and 20d are provided corresponding to the respective photoconductive drums 12a to 12d. The primary transfer rollers 20a to 20d are in contact with the intermediate transfer belt 17 at the rear side above the corresponding photoconductive drums 12a to 12d. The primary transfer rollers 20a, 20b, 20c, and 20d are opposed to the process cartridges 11a to 11d via the intermediate transfer belt 17. The primary transfer rollers 20a to 20d are operable to be charged by positive (+) electrical charges. The charged primary transfer rollers 20a to 20d transfer the toner images formed on the respective photoconductive drums 12a to 12d onto the intermediate transfer belt 17. An intermediate transfer belt cleaner 21 for removing residual toner on the intermediate transfer belt 17 is provided.

On the other hand, below the image forming part 3, a sheet feeding cassette 23 of the sheet feeding part 4 containing sheets is provided. A pickup roller 24 for picking up the sheets one by one from the sheet feeding cassette 23 is provided. A secondary transfer roller 22 is provided facing the secondary transfer opposing roller 19 with the intermediate transfer belt 17 interposed therebetween. A pair of resist rollers 25 for supplying sheets to between the secondary transfer roller 22 and the intermediate transfer belt 17 at predetermined timing is provided. Further, above the intermediate transfer belt 17, a fixing unit 26 for fixing the toner image on the paper is provided.

FIG. 2 is a block diagram showing an exemplary configuration of the image forming part 3.

The image forming part 3 has an image processor 30, a controller 40, a printer 50, and an operational display 60. The image processor 30 processes the image signal read from the scanner part 2 and converts the signal into a print signal to be output to the printer 50. The controller 40 controls operations of the scanner part 2, the image processor 30, and the printer 50. The operational display 60 communicates instruction data and display data about image forming operation to the controller 40. The operational display 60 outputs an original document mode set by a user to the image processor 30 through the controller 40.

The image processor 30 has a color conversion unit 31, a density conversion unit 32, a histogram generation unit 33, a background-removal level calculation unit 34, a background removal unit 35, a density adjustment unit 36, a toning unit 37, and a recording unit 38.

The color conversion unit 31 converts data of three primary colors R, G, B input from the scanner part 2 into a CMY signal. The density conversion unit 32 generates a density signal on the basis of the CMY signal. The histogram generation unit 33 generates a histogram of the density signal. The background-removal level calculation unit 34 calculates a level of the CMY signal for removing background on the basis of the histogram. The recording unit 38 records a reference table for determining the background-removal level value.

The background removal unit 35 removes a background component from the CMY signal. The density adjustment unit 36 adjusts a density level on the basis of density adjustment value set by a user. The toning unit 37 performs a filtering, an inked drawing, a halftoning, and the like on a signal and outputs the signal to the printer 50.

Subsequently, operations of the image processor 30 will be described.

As described above, the color conversion unit 31 converts the RGB signal input from the scanner part 2 into the CMY signal. Each of the density conversion unit 32 and the background removal unit 35 receives the converted CMY signal.

The density conversion unit 32 generates a density signal by performing calculation expressed as the following Formula 1 on the CMY signal.

$$\text{Density Signal} = (C \times \alpha + M \times \beta + Y \times \gamma)/(\alpha + \beta + \gamma) \quad \text{Formula 1}$$

Here, C, M, and Y are defined as signal values of the CMY signal, and $\alpha$, $\beta$, and $\gamma$ are defined as preset coefficients. The coefficients may be variable in accordance with the original document mode and the like.

The histogram generation unit 33 generates a density histogram of which a horizontal axis represents density and a vertical axis represents event frequency of the density, on the basis of the converted image data in the input density signal. The histogram data is made while integrating the input signal. Accordingly, when a density signal of an n-th line in a subscan direction is processing, density histogram is generated on the basis of the density signals of first to n-th lines.

Figure 3:
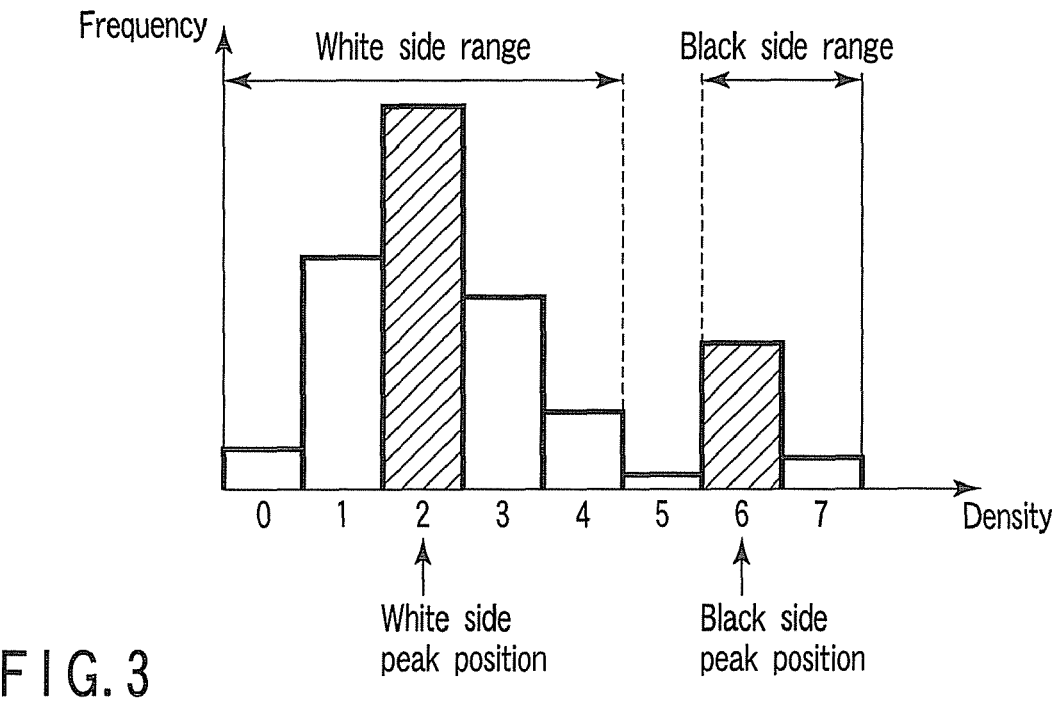
FIG. 3 is a diagram showing an example of a density histogram when the multi-level number of image data is set to "8".

FIG. 3 shows an example of a density histogram when the multi-level number of image data is set to "8". The histogram generation unit 33 outputs the generated density histogram signal to the background-removal level calculation unit 34.

The background-removal level calculation unit 34 detects two peak positions in the density histogram. For example, four typical forms of the density histogram are as follows.

Case 1: One peak exists, Case 2: Two peaks exist, Case 3: Three or more peaks exist, Case 4: A plurality of bars having the same frequency as selectable peak positions exists. Examples of methods of determining peak positions are described as follows.

[Case 1: One Peak Exists]

Figure 4:
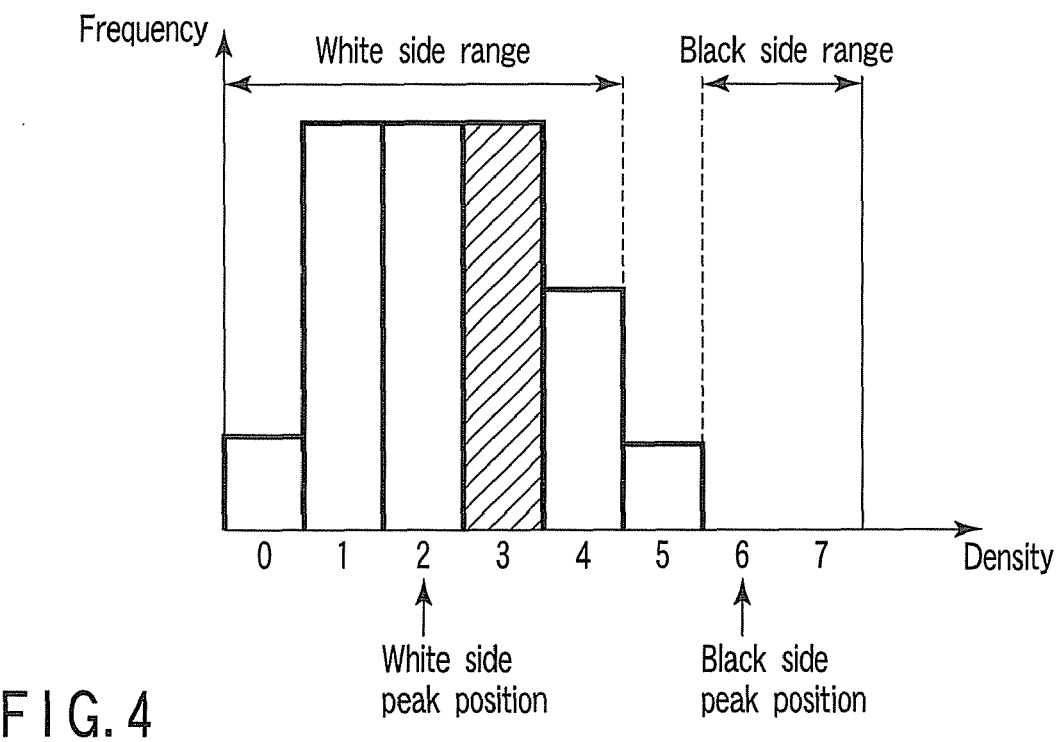
FIG. 4 is a diagram showing a density histogram in which one peak exists when the multi-level number is 8.

FIG. 4 shows a density histogram in which one peak exists when the multi-level number is 8. In the histogram, it is necessary to determine two peaks, a white side peak and a black side peak, and thus a range for obtaining the white side peak and a range for obtaining the black side peak are previously set. In FIG. 4, a range of "0" to "4" is set as the white side range, and a range of "6" to "7" is set as the black side range.

In FIG. 4, a peak exists in the white side range. In a range where a peak exists (in FIG. 4, the white side range), a peak position is detected in the same way as the case where "two peaks exist". In a range where a peak does not exist (in FIG. 4, the black side range), a peak position is determined as a position satisfying a predetermined condition. Examples of the condition include "a bar having the highest density", "a bar having the lowest density", "a bar having a density in the middle of a scan density range", and the like.

As described above, when all bars have a frequency of "0" or has the same frequency in the scan density range, it is considered that a peak does not exist. However, even in this case, it is possible to determine one peak position for each of the white side range and the black side range in the manner mentioned above. For example, in the density histogram shown in FIG. 4, the peak position in the white side range can be defined as a position of "a bar having the highest frequency and the highest density" and the peak position in the black side range can be defined as a position of "a bar having the lowest density". In this case, the white side peak position is determined as "3" and black side peak position is determined as "6".

[Case 2: Two Peaks Exist]

FIG. 3 shows a density histogram in which two peaks exist when the multi-level number is 8. In the histogram, it is necessary to determine two peaks, a white side peak and a black side peak, and thus a range for obtaining the white side peak and a range for obtaining the black side peak are previously set. In FIG. 3, a range of "0" to "4" is set as the white side range, and a range of "6" to "7" is set as the black side range. In the ranges, a position satisfying a predetermined condition is determined as a peak position. Examples of the condition include "a bar having n-th highest frequency in the scan density range", "a right side bar of a bar having the highest frequency in the scan density range", "a left side bar of a bar having the highest frequency in the scan density range", "a bar having a frequency closest to n % of the highest frequency in the scan density range", and the like.

Peak positions are detected by one of the conditions or combination among the conditions. The case where a plurality of the bar having the same frequency exists will be described later. For example, in the density histogram shown in FIG. 3, each of the peak positions in the white side range and the black side range can be defined as a position of "a bar having the first highest frequency in the scan density range". In this case, the white side peak position is determined as "2" and black side peak position is determined as "6".

[Case 3: Three or More Peaks Exist]

Figure 5:
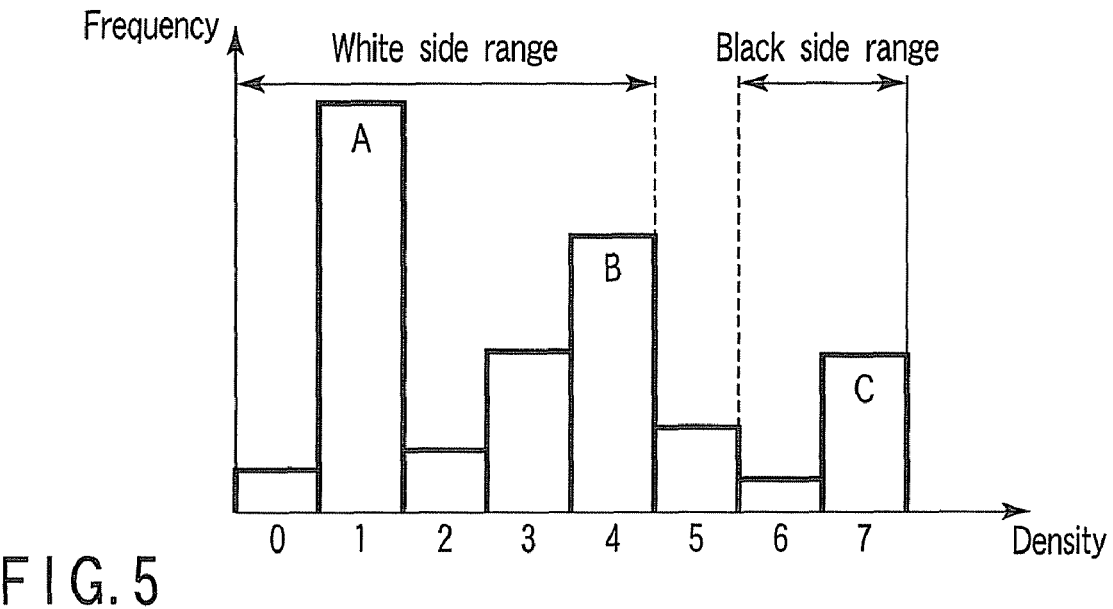
FIG. 5 is a diagram showing a density histogram in which three peaks exist when the multi-level number is 8.

FIG. 5 shows a density histogram in which three peaks exist when the multi-level number is 8. In the histogram, it is necessary to determine two peaks, a white side peak and a black side peak, and thus a range for obtaining the white side peak and a range for obtaining the black side peak are previously set. In FIG. 5, a range of "0" to "4" is set as the white side range, a range of "6" to "7" is set as the black side range, and three bars as selectable peak positions are represented as A, B, and C in the ascending order of density, respectively. When only one peak exists in the scan density range (in FIG. 5, the black side range), a peak position is obtained in the same way as the case where "two peaks exist". When a plurality of peaks exists in the scan density range, a position satisfying a predetermined condition is determined as a peak position. Examples of the condition include "a bar having n-th highest frequency", "a bar having the highest density", "a bar having the lowest density", "a bar having the highest frequency in a case where the second highest frequency is not more than n % of the first highest frequency, or a bar having a higher density in other cases", and the like.

Peak positions are detected by one of the conditions or combination among the conditions. The case where a plurality of the bar having the same frequency exists will be described later. For example, in the density histogram shown in FIG. 5, each of the peak positions in the white side range and the black side range can be defined as a position of "a bar having the first highest frequency in the scan density range". In this case, the white side peak position is determined as "1" of A and black side peak position is determined as "7" of C.

[Case 4: A Plurality of Bars Having the Same Frequency as Selectable Peak Positions Exists]

As shown in FIG. 4, when a plurality of bars having the same frequency exists, a position satisfying a predetermined condition is determined as a peak position. Examples of the condition include "a bar having the highest density in the selectable peak positions", "a bar having the lowest density in the selectable peak positions", "a bar having an intermediate density of the selectable peak positions", and the like.

Next, a method of calculating a white reference value and a black reference value will be described. The background-removal level calculation unit 34 calculates a reference value from the peak position signal detected by the logic mentioned above and the density histogram signal generated in the histogram generation unit 33. The white reference value and the black reference value are calculated by the same formula.

Figure 6:
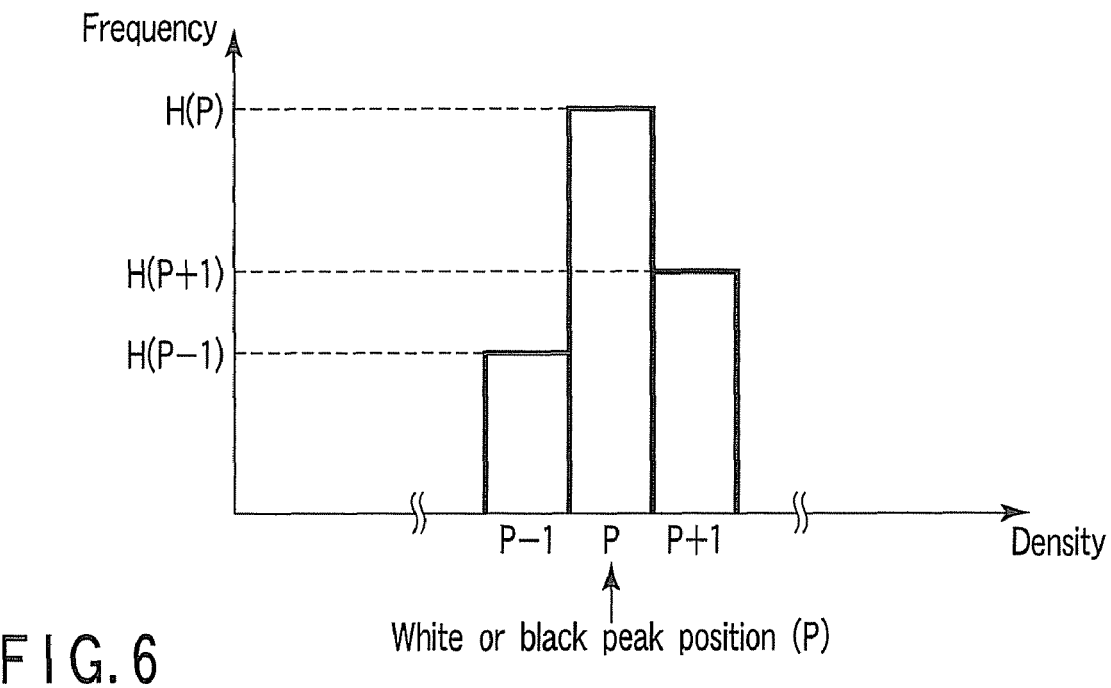
FIG. 6 is a diagram showing a density histogram in which each frequency of bars at a peak position and the left and right is represented.

FIG. 6 shows each frequency of bars at a peak position and the left and right in a density histogram. Here, P represents a peak position (density), and P−1 and P+1 represent density values of the left and right bars thereof, respectively. Furthermore, H[P], H[P−1], and H[P+1] represent frequencies of P, P−1, and P+1, respectively.

If P−1 or P+1 does not exist, non-existence can be represented by H[P−1]=0 or H[P+1]=0, and also a value of an imaginary bar can be determined by a predetermined condition, for example, in which H[P−1]=H[P] or H[P+1]=H[P]. If H[P−1] or H[P+1] is larger than H[P], it is assumed that H[P−1]=H[P] or H[P+1]=H[P].

Reference value K is represented by Formula 2.

$$K=P+(H[P+1]-H[P-1])/H[P]\times\{(\text{Density Width Of One Bar})\times \frac{1}{2}\} \quad \text{Formula 2}$$

By using the processing mentioned above, the background-removal level calculation unit 34 calculates a reference value. Here, as a reference value, there are a white reference value and a black reference value, but the background-removal level calculation unit 34 calculates a white reference value. A value of the reference value signal obtained by the background-removal level calculation unit 34 is calculated at stated periods set previously. Thus, it is possible to determine a new white reference value at the stated periods.

The density value of the peak in the white side range obtained in such a manner is determined as a white reference value. The white reference value corresponds to an amount of background and a background density of an original document. As described above, the white reference value corresponds to a density value at the maximum value in the white side range. Accordingly, the white reference value is included in the density range subjected to the background removing. In the embodiment, the maximum value in the density range subjected to the background removing is calculated as a background-removal level value by corresponding to the white reference value.

The background-removal level calculation unit 34 calculates the background-removal level value by using a reference table on the basis of the determined white reference value. Here, the reference table is provided corresponding to an original document mode set by a user. The original document mode represents kinds of original documents. The background-removal level calculation unit 34 determines the corresponding reference table in accordance with the original document mode set by a user.

In the image forming apparatus according to the embodiment, user can set as the original document mode "letter mode", "print photo mode", "photographic paper mode", "letter and photo mode", and "map mode".

Figure 7:
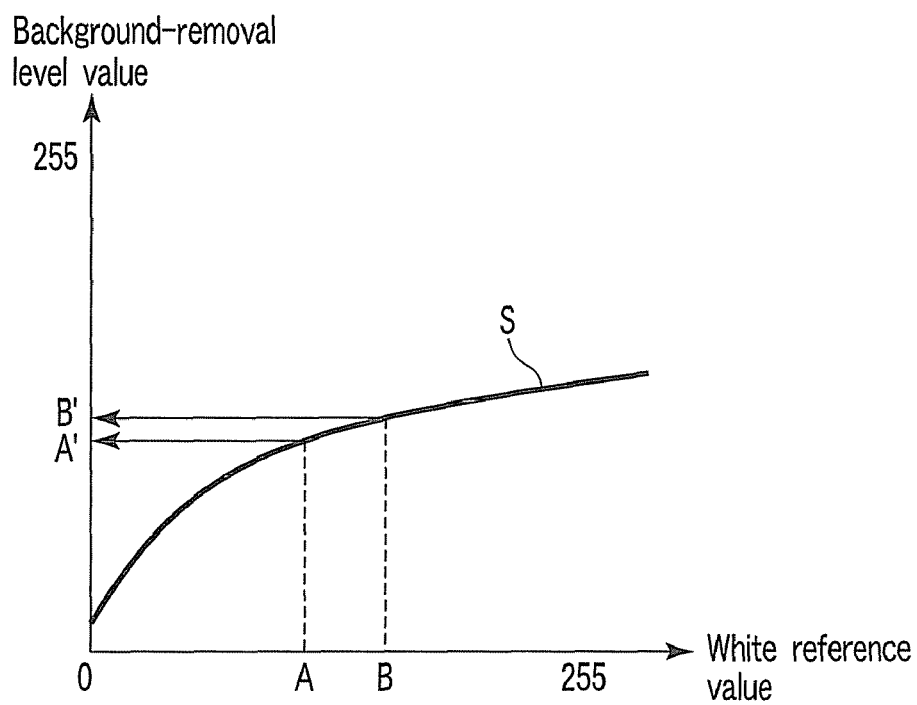
FIG. 7 is a diagram showing a method of calculating a background-removal level value.

FIG. 7 is a diagram showing a method of calculating a background-removal level value.

The horizontal axis of the coordinate represents a white reference value, and the vertical axis thereof represents a background-removal level value. Each unit of the vertical axis and horizontal axis is a tone depth. Accordingly, as a value increases, density increases, that is, it is represented that color is darkened. In addition, the curve S represents a value defined by the reference table.

By using the reference table, when the white reference value is A, the background-removal level value is calculated as A'. When the white reference value is B, the background-removal level value is calculated as B'. As described above, the background removing is performed on a signal having a tone depth smaller than the background-removal level value calculated herein. Specifically, the background-removal level value represents the maximum density for performing the background removing.

Furthermore, in the reference table, the original document mode is set to "letter and photo mode". In the reference table, variation (gradient) on the high density side (black side) becomes smaller than variation (gradient) on the low density side (white side). As a result, input original documents include letter original documents and photo original documents mutually mixed, and thus even when a white reference value detected at a certain timing is A and an amount of background detected thereafter changes into B', variation (A'-B') of the background-removal level value is small. Therefore, it is possible to keep removal amount in the background removing to be described later at substantially the same level. Accordingly, by making variation (gradient) on the high density side small, it is possible to reproduce a good image without tone reversal and the like.

Figure 8:
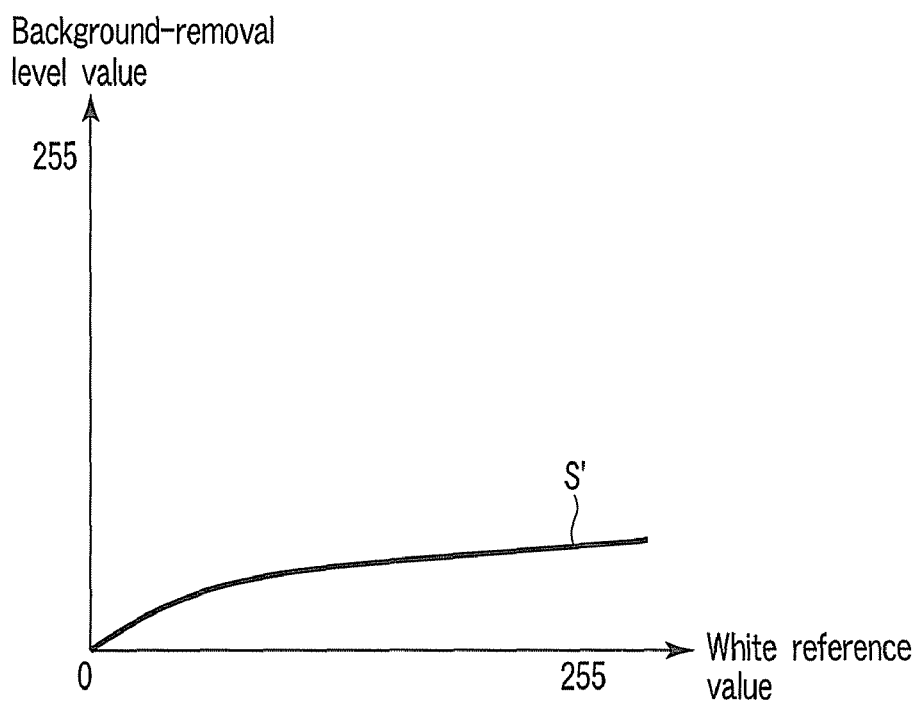
FIG. 8 is a drawing showing a reference table when an original document mode is set to "photo mode".

FIG. 8 shows a reference table when an original document mode is set to "photo mode". A background-removal level value of the curve S' shown in FIG. 8 is set lower than that of the curve S shown in FIG. 7. As a result, it is possible to remove background from a photo image without deterioration in linear tone characteristics of the photo image. When the background removing is not desired, it is also possible to output without performing the background removing by changing all table values into 0.

The calculated background-removal level value is input to the background removal unit 35. The background removal unit 35 removes a background component from a CMY signal. A calculation method of the background removing will be described with respect to a cyan (C) signal.

When the input C signal value is less than the white reference value, the background removal unit 35 calculates a background processing output value on the basis of the following Formula 3.

$$\text{Background Processing Output Value}=0 \quad \text{Formula 3}$$

When the input C signal value is not less than the white reference value and less than the background-removal level value, the background removal unit 35 calculates a background processing output value on the basis of the following Formula 4.

Background Processing Output Value=(C−White Reference Value)/(Background-Removal Level Value−White Reference Value)×Background-Removal Level Value      Formula 4

When the input C signal value is not less than the background-removal level value, the background removal unit 35 calculates a background processing output value on the basis of the following Formula 5.

Background Processing Output Value =C Signal Value    Formula 5

Figure 9:
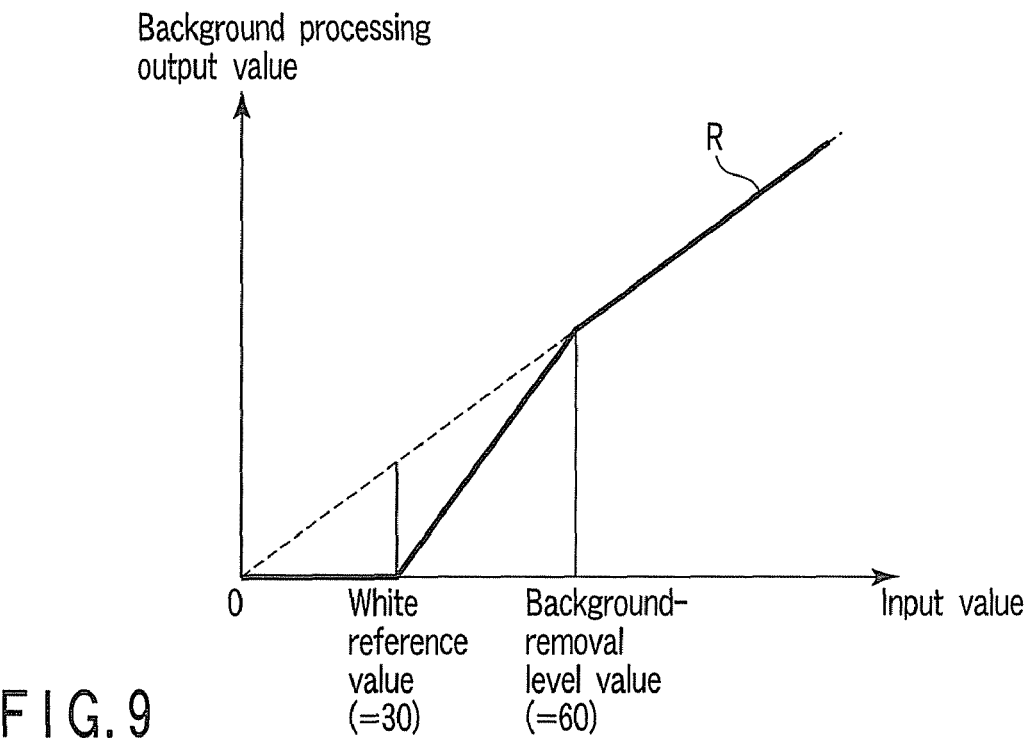
FIG. 9 is a diagram explaining characteristic curve R of background processing.

FIG. 9 is a diagram explaining characteristic curve R of background processing. Here, the characteristic curve R in which white reference value (tone depth)=30, background-removal level value (tone depth)=60 is represented by a solid line. A part represented by a dotted line indicates linear characteristics when the background removing is not performed.

As shown in FIG. 9, the input signal less than the white reference value (30) is converted into a signal having 0 tone depth. Furthermore, the input signal not less than the background-removal level value (60) is output without any conversion. The input signal not less than the white reference value (30) and less than the background-removal level value (60) is output by renewing to keep continuity of the background processing output value.

The description mentioned above is for the processing for the cyan (C) signal, but the same processing method may be applied to other signals.

Figures 10A, 10B:
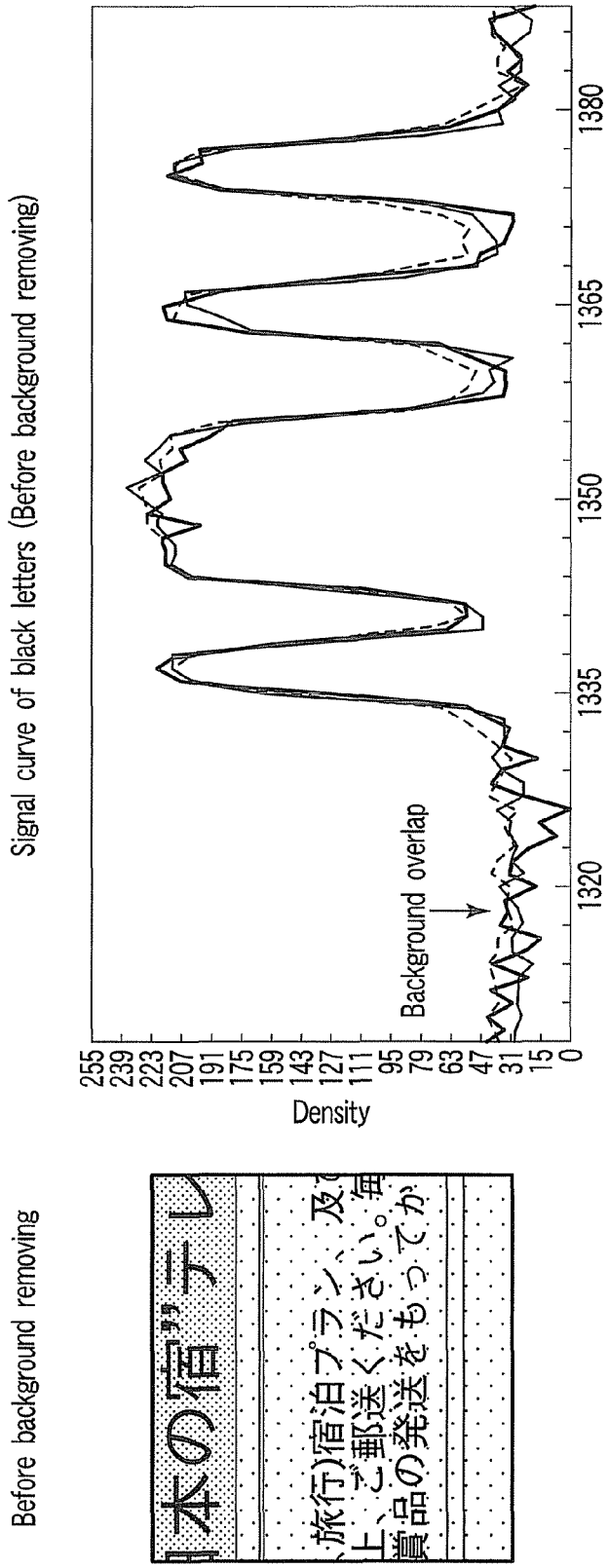
FIGS. 10A and 10B are diagrams showing an image before a background removing and a signal curve of a part of lines on which letters of the image are noted.

FIG. 11A shows an image before the background removing. FIG. 10B shows a signal curve of a part of lines on which letters of the image are noted. In FIG. 10B, the horizontal axis represents a position in a main scan direction, and the vertical axis represents each signal value of CMY. In FIG. 10B, a part of the curve having a high signal value represents existence of a letter. In the left side of the graph, there is an area in which low signal values are consecutive, the consecutive signal values in the area correspond to a background component.

FIG. 11A shows the image after the background removing. FIG. 11B shows a signal curve of the part of lines on which letters of the image are noted. As compared with FIGS. 10A and 10B, only background component area is removed, and quality deterioration caused by the removing has no influence on the high density part corresponding to letters and the like.

The density adjustment unit 36 adjusts density for the signal after the background processing mentioned above in accordance with a density adjustment value set by a user. The toning unit 37 performs filtering, inked drawing, and halftoning to output the image signal to the printer.

Furthermore, in the embodiment mentioned above, the signal less than the white reference value is converted into a density signal having a value of 0, but the invention is not limited to this embodiment. Accordingly, the signal less than the white reference value may be converted into a density signal indicating the minimum density.

In the embodiment mentioned above, the case where the signal input from the scanner is output to the printer was described. However, an aspect of the invention may be applied even when the input signal is processed through network. In this case, in the case of color conversion, the input signal is converted into an sRGB signal and the like, and the signal is converted into density. Thus, it is possible to apply the same processing.

Furthermore, according to an aspect of the invention, individual variation in scanners may be corrected.

Figure 12:
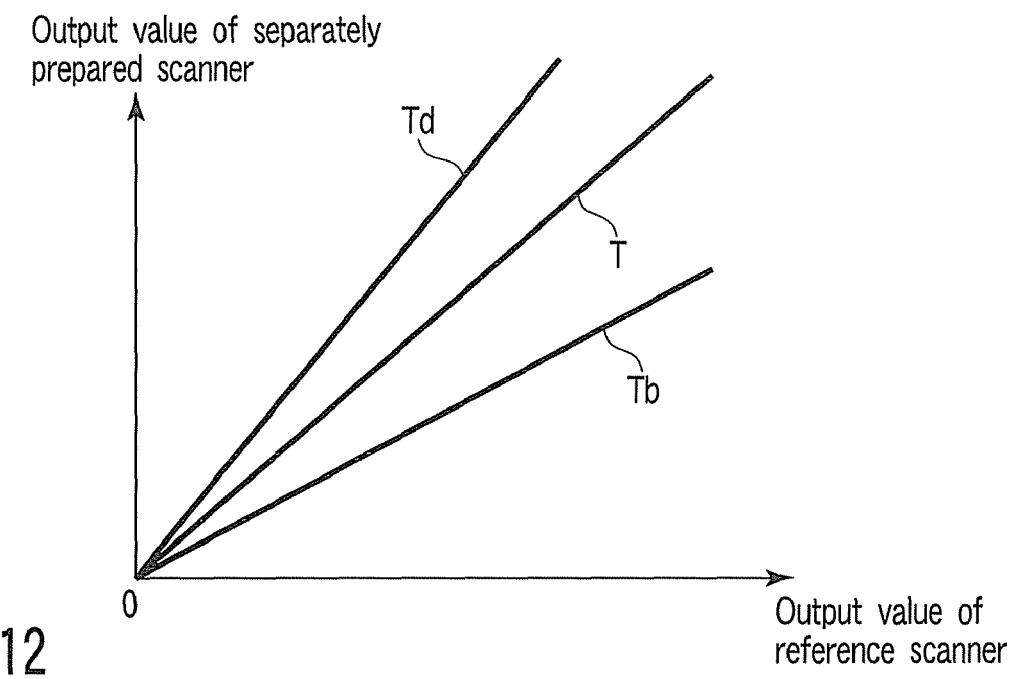
FIG. 12 is a diagram showing a method of correcting individual variation in scanners.

FIG. 12 is a diagram showing a method of correcting individual variation in scanners. The horizontal axis of the coordinates represents an output signal value read by a reference scanner. The vertical axis of the coordinates represents an output signal value read by a separately prepared scanner. When the characteristics of the scanners coincide with each other, output values of those are all the same as represented by the characteristic curve T. However, when the separately prepared scanner outputs darker image data, the characteristic is represented by the characteristic curve Td. However, when the separately prepared scanner outputs brighter image data, the characteristic is represented by the characteristic curve Tb.

Accordingly, a correspondence table of a background-removal level value and a white reference value read by the separately prepared scanner is corrected with obtained characteristics from both scanners. Thus, it is possible to perform the background removing appropriate to a signal value read by the separately prepared scanner. For example, when the characteristic is represented by the characteristic curve Td, the background-removal level value may be corrected to be higher. When the characteristic is represented by the characteristic curve Tb, the background-removal level value may be corrected to be lower.

As described above, an original document having a predetermined tone characteristic is input by a scanner, difference between the input value and a tone depth of the reference scanner is calculated, and the difference amount is reflected in the background removing table. Thereby, it is possible to perform correction even on individual variation in scanners.

Furthermore, in the embodiment mentioned above, it is possible to set "letter mode", "print photo mode", "photographic paper mode", "letter and photo mode", and "map mode" as an original document mode, but the invention is not limited to this embodiment. Accordingly, when a mode defines an original document type, the mode may be set as the original document mode.

The image forming part is not limited to a device for forming a color image by using a toner, and for example, all devices capable of forming a color image by using ink may be employed.

Additional advantages and modifications will readily occur to those skilled in the art. Therefore, the invention in its broader aspect is not limited to the specific details and representative embodiments shown and described herein. Accordingly, various modifications may be made without departing from the spirit or scope of the general inventive concept as defined by the appended claims and their equivalents.

What is claimed is:

1. An image processing device comprising:
   a histogram generation unit configured to generate a density histogram on the basis of image data of an original document;
   a white-reference value detection unit configured to acquire as a white reference value a density value at a density distribution peak in a predetermined white side range of the density histogram;
   a background-removal level determination unit configured to determine a background-removal level value having the maximum density to remove a background component by using a reference table on the basis of the white reference value; and
   a background removal unit configured to remove the background component from the image data by using the white reference value and the background-removal level value.

2. The device according to claim 1,
   wherein the reference table contains the white reference value and the background-removal level value set to correspond to each other for each original document mode.

3. The device according to claim 2,
wherein in a ratio of variation of the background-removal level value to variation of the white reference value, a high density side value is smaller than a low density side value.

4. The device according to claim 3,
wherein the reference table further contains the white reference value and the background-removal level value set to correspond to each other for each input characteristic of scanners reading the original document.

5. The device according to claim 1,
wherein on the image data of the original document, the background removal unit performs conversion of a signal indicating a value less than the white reference value to a density signal indicating the minimum density value, and conversion of a signal indicating a value not less than the white reference value and less than the background-removal level value to a density signal indicating a value in the range from the minimum density value to the background-removal level value.

6. The device according to claim 5,
wherein the converted density signal indicating a value in the range from the minimum density value to the background-removal level value has a linear characteristic.

7. The device according to claim 1,
wherein the histogram generation unit generates one density signal on the basis of a plurality of color signals when the input image data is the plurality of color signals.

8. The device according to claim 1,
wherein the background removal unit removes the background component from the color signals by using the white reference value and the background-removal level value.

9. The device according to claim 1, further comprising a density adjustment unit configured to adjust density for the image data processed by the background removing in accordance with a preset density adjustment value.

10. An image processing method comprising:
generating a density histogram on the basis of image data of an original document;
acquiring as a white reference value a density value at a density distribution peak in a predetermined white side range of the density histogram;
determining a background-removal level value having the maximum density to remove a background component by using a reference table on the basis of the white reference value; and
removing the background component from the image data by using the white reference value and the background-removal level value.

11. The method according to claim 10,
wherein the reference table contains the white reference value and the background-removal level value set to correspond to each other for each original document mode.

12. The method according to claim 10,
wherein in the removing of the background component, the image data of the original document is subjected to conversion of a signal indicating a value less than the white reference value to a density signal indicating the minimum density value, and conversion of a signal indicating a value not less than the white reference value and less than the background-removal level value to a density signal indicating a value in the range from the minimum density value to the background-removal level value.

13. The method according to claim 10,
wherein in the generating of the density histogram, one density signal on the basis of a plurality of color signals is generated when the input image data is the plurality of color signals.

14. The method according to claim 10,
wherein in the removing of the background component, the background component is removed from the color signals by using the white reference value and the background-removal level value.

15. The method according to claim 10, further comprising adjusting density for the image data processed by the background removing in accordance with a preset density adjustment value.

16. An image reading device comprising:
an image input unit configured to form image data by irradiating an original document with light and photoelectrically converting the light reflected from the original document;
a histogram generation unit configured to generate a density histogram on the basis of the image data;
a white-reference value detection unit configured to acquire as a white reference value a density value at a density distribution peak in a predetermined white side range of the density histogram;
a background-removal level determination unit configured to determine a background-removal level value having the maximum density to remove a background component by using a reference table on the basis of the white reference value; and
a background removal unit configured to remove the background component from the image data by using the white reference value and the background-removal level value.

17. The device according to claim 16,
wherein the reference table contains the white reference value and the background-removal level value set to correspond to each other for each original document mode.

18. The device according to claim 16,
wherein on the image data of the original document, the background removal unit performs conversion of a signal indicating a value less than the white reference value to a density signal indicating the minimum density value, and conversion of a signal indicating a value not less than the white reference value and less than the background-removal level value to a density signal indicating a value in the range from the minimum density value to the background-removal level value.

19. The device according to claim 16,
wherein the histogram generation unit generates one density signal on the basis of a plurality of color signals when the input image data is the plurality of color signals, and
wherein the background removal unit removes the background component from the color signals by using the white reference value and the background-removal level value.

20. The device according to claim 16, further comprising a density adjustment unit configured to adjust density for the image data processed by the background removing in accordance with a preset density adjustment value.

* * * * *